UNITED STATES PATENT OFFICE 2,072,631

THERMOPLASTIC ADHESIVE

Ralph M. Freydberg, New York, N. Y., assignor to Acme Backing Corporation, Brooklyn, N. Y., a corporation of New York No Drawing. Application November 17, 1934, Serial No. 753,543

3 Claims. (Cl. 154—46)

My present invention relates to adhesive compositions, and particularly to thermoplastic adhesive compositions especially, though not exclusively, adapted for use in producing laminated fabrics possessing certain desirable qualities and characteristics hereinafter pointed out.

I am aware that it has been proposed to produce laminated fabrics by providing between the layers, thermoplastic compositions and adhesive compositions of synthetic resin which unite the layers of the fabrics when subjected to heat and pressure or to special solvents. So far as I am aware, there has not been proposed or provided a thermoplastic adhesive composition for uniting layers of fabrics capable of use on articles subjected to laundering and/or dry-cleaning, and which will withstand the effects of the laundering or dry-cleaning solutions and/or the heat to which the articles are subjected in such operations.

In the manufacture of many articles of wearing apparel, it is customary or necessary to provide an inner or intermediate lining intended to impart to the articles a stiffness or body which will maintain them in desired shape conducive to a neat appearance. I might give many illustrations of such articles, but I will only point out a few as illustrative, such as collars, both attached and unattached, cuffs, etc. In the manufacture of collars and cuffs, it is usual to provide inner and outer layers of soft or limp fabric between which is an interlining of a different nature or character, usually stiffer. The purpose of the interlining is to impart additional body or stiffness to the articles, so that the articles will maintain their shape before and after laundering, and/or dry-cleaning and pressing. However, each laundering operation requires the use of starch to impart to the article a stiffness beyond the normal stiffness of the fabrics from which the articles are made. Also, the inner and outer layers and interlining are usually stitched or bound together adjacent their edges, and since the several layers are attached or secured together only at their margins, they have relative movement between their margins, which results in the formation of visible and objectionable wrinkles or creases when being pressed or ironed.

With the foregoing in mind, the general object of my present invention is to provide a thermoplastic composition or compositions with which to coat and/or impregnate fabrics, so that they may be used as interlinings or backings firmly adhering to other fabrics to which united when subjected to the action of heat and pressure to form a substantially integral laminated fabric not subject to the foregoing objections and faults.

The foregoing general object is accomplished by providing a composition or compositions easily applied to the fabric forming the interlinings or backings, which imparts to the linings or backings a permanent flexible stiffness not affected by moisture or heat; and which is not adversely affected by exposure to light.

The results of the foregoing are that when the impregnated fabric or interlining is united to another or other fabrics by heat and pressure, all of the fabrics are firmly and uniformly united throughout their entire contacting faces, and the fabric or fabrics to which the interlining or backing is or are united forms a substantially unitary fabric with no possibility of relative movement therebetween, so that no objectionable creases or wrinkles will be created during an ironing or pressing operation. Since the interlining possesses a flexible stiffness not affected by moisture or heat, this same flexible stiffness is imparted to the fabric or fabrics united thereto obviating the use of starch when laundering the articles made from the laminated fabric; and since the composition is not adversely affected by exposure to light, the laminated fabric will not be discolored.

As will be hereinafter pointed out, the laminated fabric may be freely washed or drycleaned under the usual procedures or formulas because the composition uniting the fabrics will not be adversely affected thereby, and each time the articles made from the laminated fabric are. ironed or pressed, the same will retain their original characteristics and appearance, namely, smoothness, flexible stiffness, (which flexible stiffness is such as to obviate visible cracks or wrinkles if the articles are bent), and firm adhesion or substantially integral formation.

Another important feature of the invention resides in the fact that the composition or compositions may be substantially transparent in character, so that they will not alter the color of the fabric impregnated thereby. For instance, a white fabric impregnated with the composition may be inserted between other layers of white fabrics secured thereto without affecting the whiteness of the outer layers and/or may be inserted between layers of colored materials, either plain or designed, without affecting the appearance of such materials. On the other hand, the composition may be colored as desired, as hereinafter pointed out.

The weight or thickness of the material to be impregnated to form the interlining or backing depends of course on the use to which it is to be put. In the cases cited above as illustrative, such as collars, cuffs, shirt bosoms, and other relatively light materials, between which the impregnated fabric is to be used, I would select a material such as cotton sheeting, though of course if the impregnated fabric is to be used in conjunction with heavier materials to form an interlining or backing therefor, I might select a material heavier than cotton sheeting.

The thermoplastic composition or compositions with which I coat and/or impregnate a fabric includes a composite polymer of vinyl acetate and vinyl chloride, which is insoluble in alcohol, gasoline, naphtha, benzine, water, and usual laundering fluids. A preferred formula is as follows:—

*Example I*

| | Per cent |
|---|---|
| Composite polymer of 40% vinyl acetate and 60% vinyl chloride | 51 |
| Calcium stearate | 1 |
| Tornesite (chlorinated rubber) | 1 |
| Acetone | 47 |

The above formula may be varied by using between 90% and 25% of vinyl acetate, to between 75% and 10% of vinyl chloride according to the respective proportions of the ingredients. Although I have cited calcium stearate, which acts as a homogenizer, I may use any other alkali metal stearate for the same purpose. The chlorinated rubber acts as a negative catalyst; and, of course, the acetone is the solvent, for which I may substitute ethyl acetate.

When the ingredients above mentioned are thoroughly admixed, the resulting composition is a viscous substantially transparent or clear fluid, which may be applied cold or at ordinary temperatures to the fabric by any known type of coating or impregnating mechanism, such as doctor-blades or rollers. Furthermore, by sufficiently diluting the solution a viscosity may be obtained suitable for spraying, so that the composition can be sprayed on the fabric.

*Example II*

| | |
|---|---|
| Composite polymer of vinyl acetate and vinyl chloride | 100 parts |
| Dibutyl phthalate | 10% |
| Chlorinated rubber | 1% |

The above ingredients would be mixed by subjection to heat and stirring, that is, in a heated mixer which would produce a paste-like composition, applied hot to the fabric by calender rollers.

Under Example II, the proportions of the vinyl acetate and vinyl chloride in the composite polymer can be varied over the same range, or used in the same proportions, as under Example I. The dibutyl phthalate acts as the plasticizer, and the chlorinated rubber as the negative catalyst.

It will be understood that the composite polymer of which I speak, consists of vinyl acetate and vinyl chloride mixed together and then polymerized, and not a mixture of separately polymerized vinyl acetate and vinyl chloride.

Compositions made in accordance with the above formulas and embodying the essential features thereof begin to soften at 180° F., and firmly unite layers of fabric when subjected to a temperature of about 300° F. and pressure.

It will be understood that when the composition is used as a coating on a lining or backing fabric, the layer of the composition on the fabric firmly unites said lining to other fabrics, when the same are subjected to pressure and heat at a temperature of about 300° F., which is about the usual temperature of laundering irons. The coated lining or backing is dry when subjected to the heat and pressure, and the coating is melted by the heat so that it adheres to the other fabrics under pressure.

I wish it to be understood, that it is not essential to the use of the composition that it be applied to a lining or backing fabric, as it can be interposed directly between two or more layers of fabric to unite them and form a substantially unitary laminated fabric possessing the characteristics above mentioned.

I have discovered that a laminated fabric embodying the said composition and united thereby may be laundered and dry-cleaned without separation of the layers. The composition softens at the usual temperature of laundering fluids or at the boiling point of water, but retains its adhesive qualities and maintains the layers united. The water or washing fluids may pass through the laminated fabric to thoroughly cleanse the same, but when the wet or damp fabrics are subjected to heat and pressure, such as the action of an iron, as soon as the moisture is expelled, the fabric regains its original appearance and characteristics, above pointed out.

I have further discovered that the compound may be colored by adding thereto mineral fillers or high strength organic colors. Of course, the addition of such fillers or colors may vary the viscosity of the compound, but they do not affect its permanent adhesive qualities.

I claim:

1. A unitary fabric comprising a plurality of layers of fabric adhesively joined by a thermoplastic composition having a melting point at approximately 300° F. and comprising substantially 100 parts composite polymer of vinyl acetate and vinyl chloride, 10% dibutyl phthalate, and 1% chlorinated rubber, said composition retaining its adhesive properties at temperatures below 212° F.

2. A fabric ply impregnated with a thermoplastic composition which maintains its adhesive qualities during laundering of the fabric and which is thermoplastic at temperatures not greater than 300° F., said composition comprising substantially 51% composite polymer of vinyl acetate and vinyl chloride, 1% alkali metal stearate, 1% chlorinated rubber, and 47% acetone.

3. A laminated fabric comprising a plurality of layers of fabric, an adhesive uniting said layers and impregnating one of said layers, said adhesive comprising a thermoplastic composition which maintains its adhesive qualities at temperatures below 212° F. comprising substantially 100 parts composite polymer of vinyl acetate and vinyl chloride, 10 parts dibutyl phthalate and 1 part chlorinated rubber.

RALPH M. FREYDBERG.